United States Patent [19]

Albert

[11] 4,445,065

[45] Apr. 24, 1984

[54] NON-PRISMAL BEAM RESONATOR

[75] Inventor: William C. Albert, Boonton, N.J.

[73] Assignee: The Singer Company, Little Falls, N.J.

[21] Appl. No.: 301,623

[22] Filed: Sep. 14, 1981

[51] Int. Cl.³ .............................................. H01L 41/08
[52] U.S. Cl. ...................................... 310/321; 310/323; 310/338; 310/367; 310/368; 310/25
[58] Field of Search ............... 310/321, 323, 330, 338, 310/348, 367, 368, 370, 15, 25; 73/777, 778, 781, DIG. 1, DIG. 4

[56] References Cited

U.S. PATENT DOCUMENTS

| | | | |
|---|---|---|---|
| 3,470,400 | 9/1969 | Weisbord | 310/323 X |
| 3,479,536 | 11/1969 | Norris | 310/323 |
| 3,513,356 | 5/1970 | Newell | 310/321 X |
| 4,167,686 | 9/1979 | Fukuyo | 310/368 X |
| 4,215,570 | 8/1980 | Nisse | 310/338 X |
| 4,321,500 | 3/1982 | Paros et al. | 310/323 X |
| 4,350,918 | 9/1982 | Sato | 310/368 X |

Primary Examiner—Peter S. Wong
Attorney, Agent, or Firm—Morris Liss; T. W. Kennedy

[57] ABSTRACT

A single beam force transducer has a beam characterized by a thickened central portion and tapered outward portions. The support members of the transducer are thickened and are thus stiffer while the isolator masses are shortened. These critical configuration changes raise the undesirable "tuning fork" resonant frequency of the beam supporting structure far above that of the beam and ensures that the isolating structure behaves as a rigid body.

8 Claims, 10 Drawing Figures

NON-PRISMAL BEAM RESONATOR

FIELD OF THE INVENTION

The present invention relates to vibrating beam accelerometers and more particularly to isolator means for isolating the vibrations of a vibratory beam from its mounts to minimize coupling between the member and its mounts over the range of operating vibration frequencies.

BRIEF DESCRIPTION OF THE PRIOR ART

In certain apparatus such as vibrating beam accelerometers, a vibratory member is supported in such a way that forces of acceleration or deceleration are applied at the ends of the apparatus to change its axial stresses. In an axially unstressed condition, a beam has a certain natural frequency of vibration, determined primarily by its dimensions the material of which it is constituted, temperature, and the media in which it is operating. In response to an axial stress applied to the beam, the beam's natural frequency of vibration changes; the frequency increasing in response to axial tension and decreasing in response to axial compression.

It is, of course, desirable that the vibration frequency of the vibratory member be a true and accurate representation of the axial stress applied to it. However, in prior art apparatus of this type, this is not the case. A certain mounting problem exists in that it is difficult to mount the member without seriously degrading its performance. There is an energy loss at the mount due to the existence of a mounting interface that, in the case of a beam, must resist the forces and moments generated by the vibrating member and, in the case of a string, must resist the forces generated. This results in a decrease in the Q factor of the resonator, that is, the ratio of energy stored to the ratio of energy lost. The frequency stability of the resonator is degraded by the decrease in Q. Moreover, instabilities of the mount result in further instabilities in the operation of the resonator.

U.S. Pat. No. 3,470,400 issued to Weisbord, assigned to the present assignee, discloses a transducer wherein the vibratory member's vibration and its changes in vibration are less influenced by its mounts so that changes in vibration would be more directly related to the actual stress applied to it.

Although the transducer of the Weisbord patent operates generally satisfactorily, it has been found that the supporting structure for the beam of the transducer including the isolator masses and support members act as oppositely directed tuning forks connected to the output ends of the beam. Undesirable "tuning fork" resonant frequencies become established which interfere with the natural resonant frequency of the beam.

BRIEF DESCRIPTION OF THE PRESENT INVENTION

The present invention is an improvement of the transducer disclosed in the previously mentioned patent. The support portion of the isolator structure is thickened and therefore stiffened which permits a shortening of the length of the isolator masses. This ensures that the isolator structure behaves as a rigid body. As a result, the "tuning fork" resonant frequency of the isolator structure is raised far above that of the beam resonant frequency.

Further, the beam of the present invention has a thicker central portion than the outer portions. As a result, the beam bends easily during vibration. As a result, bending moments exerted upon the beam are reduced thereby maintaining a high Q of the beam which minimizes loss of vibration energy produced by the beam.

The above-mentioned objects and advantages of the present invention will be more clearly understood when considered in conjunction with the accompanying drawings, in which:

DETAILED DESCRIPTION OF THE INVENTION

Figure 1:
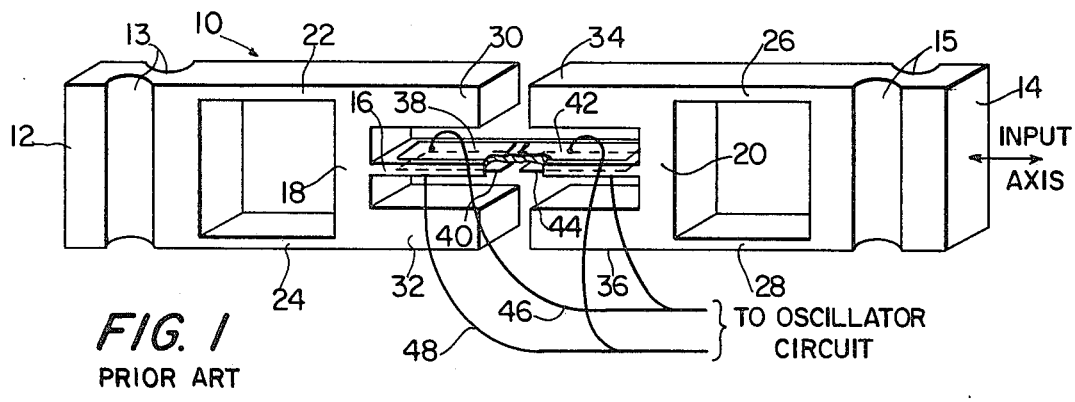
FIG. 1 is a perspective view of a vibratory beam apparatus with decoupling structure as disclosed in U.S. Pat. No. 3,470,400.

FIG. 1 of the drawings illustrates the transducer 10 disclosed in U.S. Pat. No. 3,470,400 to Weisbord which represents generally an entire vibratory beam apparatus including a pair of end mounts 12 and 14 which may be respectively recessed at 13 and 15 to form cross axis hinges and to which supporting members are attached and to which axial forces are applied along an input axis designated, when the unit is used as a force measuring unit as in an accelerometer. The transducer 10 includes a vibratory beam 16 extending between and secured to respective support members 18 and 20.

For decoupling or isolating the beam from mounts 12 and 14 at beam operating frequencies, support members 18 and 20 are connected to respective mounts 12 and 14 by pairs of spaced, thin spring members 22, 24 and 26, 28 and pairs of isolator masses 30, 32 and 34, 36 extend from respective members 18 and 20 co-extensively with a portion of the beam 16. The particular lengths and other dimensions of the masses are correlated with the beam properties, however, in all events the masses 30 and 34 are axially spaced and masses 32 and 36 are similarly axially spaced. Axial stresses, either tension or compression, applied to the end mounts 12 and 14 are transmitted to the beam 16 through the thin spring members 22, 24 and 26, 28.

The beam transducer 10 may be formed from a single block of any suitable material. However, for the sake of clarity, it will be set forth as applied to an apparatus made of quartz or other piezeoelectric material wherein to form the particular configuration shown and described, material is cut away by any suitable well-known procedure.

For driving the beam 16 in the body shear mode, pairs of electrodes 38 and 40 are attached to opposite sides of the beam along one axial extent and another pair of electrodes 42 and 44 are attached to opposite sides of the beam along another axial extent. An electronic oscillator, not shown, may provide driving excitation for the beam and leads 46 and 48 from the oscillator are connected to the electrodes. Lead 46 is connected to electrodes 38 and 44, and lead 48 is connected to electrodes 40 and 42. Thus, the electrical excitation applies oppositely directed transverse electric fields through the beam at axially spaced locations. In a manner described in detail in U.S. Pat. No. 3,479,536 issued to Frank Norris and assigned to the present assignee, this described construction and electrical excitation is effective to produce vibration in the beam. It is to be understood, however, that the beam may be driven by other means, the particular one described being only representative and preferred for particular situations.

Figure 2:
FIG. 2 is a view of a vibratory beam in a displaced position with arrows representing directions of reaction forces and reaction moments acting upon the beam.

In FIG. 2, 16' represents a momentary posture of a beam such as beam 16 in FIG. 1 in vibration, the deflections being exaggerated to aid in understanding the actions involved. The supports for the beam are replaced by shear forces R and moments M which such supports produce on the beam. Such a beam when deflected at locations intermediate to its ends, such as an "up" deflection in FIG. 2, has reaction force moments in the directions indicated by arrows. The reaction forces, R, are directed oppositely to the beam's deflection and the reaction moments, M, are in such a direction as to tend to twist the ends of the beam about an axis perpendicular to the paper and tending to oppose the deflection. The forces and moments applied by the beam into the supports vary at the frequency of the beam's vibration and have magnitudes depending on the beam's size and on its amplitude and frequency of vibration.

Unless a vibration isolation system is employed, these reactions will be transmitted to whatever the end of the resonator is attached to and much of the vibration energy will be lost. This is an undesirable effect and results in a system of low Q. The lower the Q, the more power the oscillator circuit must provide. If Q is too low, vibration may be impossible altogether.

Figure 3:
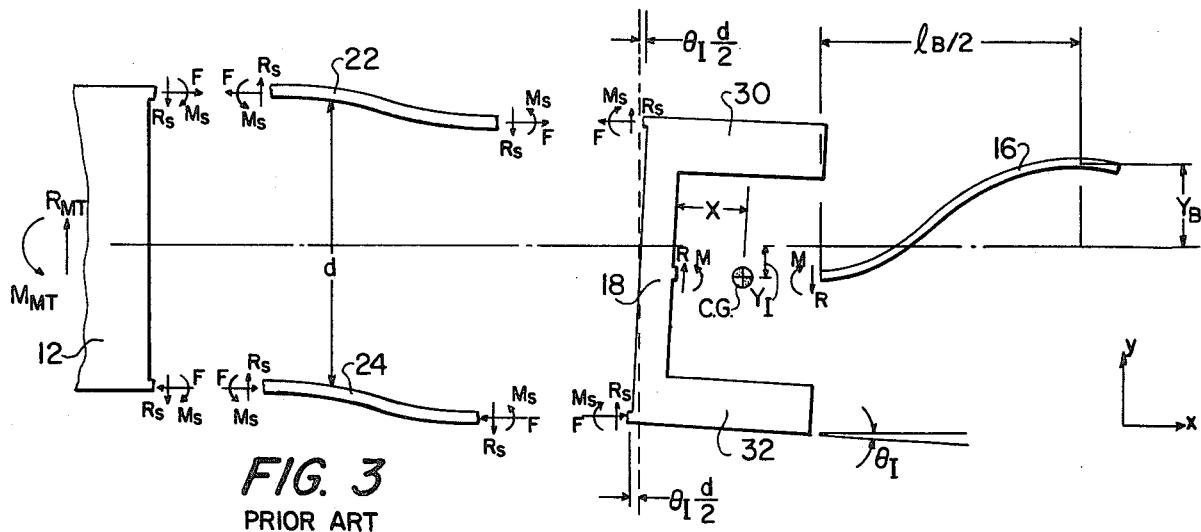
FIG. 3 is a force diagram relating to the transducer of U.S. Pat. No. 3,470,400.

The vibrating beam 16 is attached at each end to the relatively massive and rigid isolator masses 30, 32 and 34, 36. Because of their relatively high inertia, the isolator masses have very little linear or angular motion of their own compared to linear and angular motion of the central portion of the beam 16. The isolator masses are in turn attached to the end mounts by isolator springs 22, 24 and 26, 28. An exploded view of the vibrating structure which shows all the moment, shear and force reactions as well as the vibration displacements is illustrated in FIG. 3. These reactions and displacements are present because, as a result of the beam M and R reactions, the isolator mass does have some slight linear ($Y_I$) and angular ($\theta_I$) motion which is shown exaggerated in FIG. 3.

Figure 4:
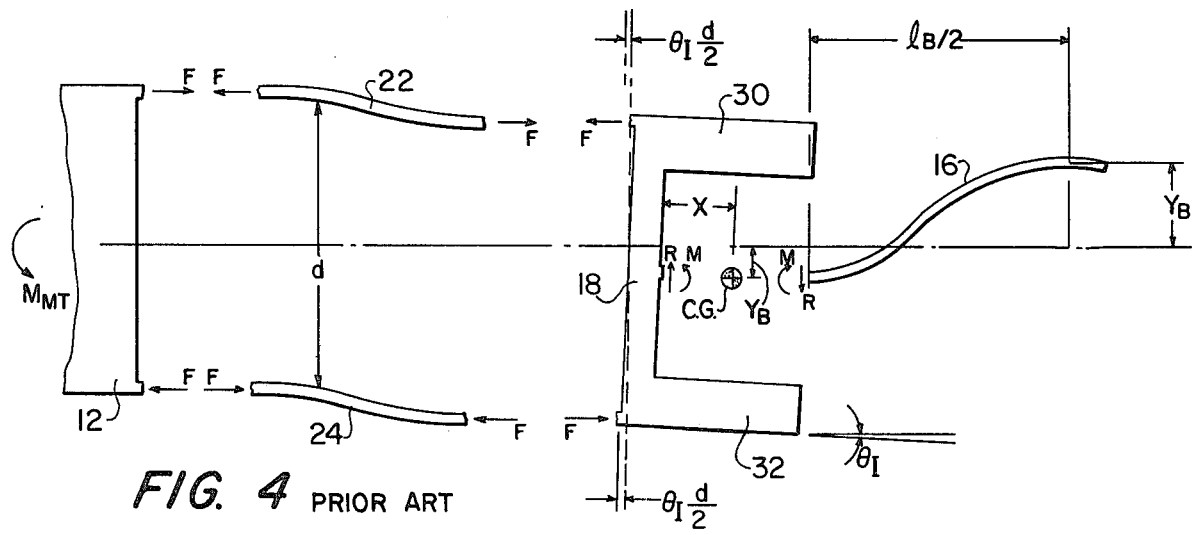
FIG. 4 is an equivalent diagram of that shown in FIG. 3.

The isolator springs are long and thin and therefore very flexible. Therefore, the moment and shear reaction at the ends of the isolator spring will be very small compared to the beam M and R reaction and the inertial reactions of the isolator masses. The isolator spring moment ($M_s$) and shear ($R_s$) reactions can therefore be assumed negligible. If these spring $R_s$ and $M_s$ reactions are negligible, the $R_{MT}$ force is also negligible since the sum of forces in the y direction on the end mount must equal zero. FIG. 3 now reduces to the approximation of FIG. 4.

The isolator spring forces F in the axial (x) direction, however, may be large since the isolator springs behave as a stiff compression (or tension) member to resist angular motion of the isolator masses.

Summing up the moments on the end mount indicates that $$M_{MT} = Fd \qquad \text{Eq. 1}$$

where d is the separation of the isolator springs in the y direction. The Weisbord patented transducer is designed to reduce or eliminate the F, and therefore the $M_{MT}$ reaction so as not to dissipate the vibration energy of the beam. The patented transducer accomplishes this as follows.

Figure 5A:
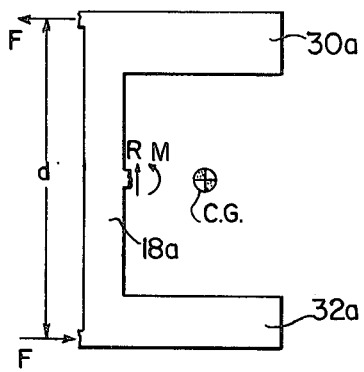
FIGS. 5A–5C show a sequence of equivalent force diagrams relating to that of FIG. 4.
Figure 5B:
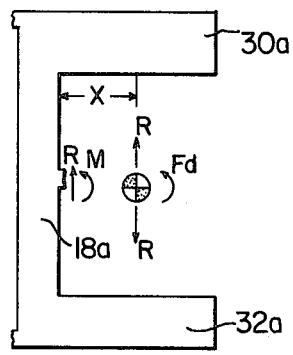
Figure 5C:
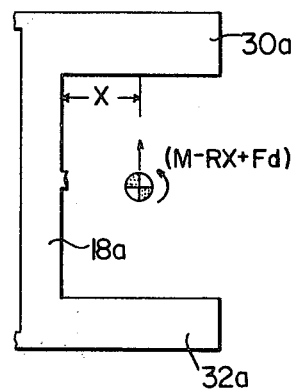

The beam shear reaction forces R are mathematically transferred to the isolator mass center of gravity (CG) by the sequence of equivalent systems shown in FIGS. 5A-5C.

Next, the moments are summed and set equal to the angular inertial reaction. (This is standard Newtonian mechanics). Note that the isolator CG is not on the isolator mass itself.

$$\text{SUM OF MOMENTS} = J\alpha \qquad \text{Eq. 2}$$

$$M - XR + Fd = J\alpha \qquad \text{Eq. 3}$$

Where
J = the mass moment of inertia of the isolator mass about a z axis which passes through the isolator mass CG in a direction perpendicular to the plane of this paper
α = the angular acceleration.

Next the force F is replaced by its equivalent which is the product of the isolator spring axial spring rate (K) as a compression (or tension) member and its deflection $d\theta/2$ in the x direction.

$$F = K\theta_I(d/2) \qquad \text{Eq. 4}$$

The motion of the isolator, both angular and linear, is harmonic at the beam resonant frequency and if we assume that FIG. 3 illustrates the vibrating system at its maximum displacement, α can be replaced by its equivalent $\theta \omega_B^2$. Making these substitutions into equation 3 results in the following equation:

$$M = XR + K\theta_I(d^2/2) = J\omega_B^2 \theta_I \qquad \text{Eq. 5}$$

After rearranging terms, Equation 5 becomes Equation 6

$$M - XR = \left(J\omega_B^2 + K\frac{d^2}{2}\right)\theta_I \qquad \text{Eq. 6}$$

After again rearranging terms $$\theta_I = \frac{M - XR}{J\omega_B^2 + K\frac{d^2}{2}} \qquad \text{Eq. 7}$$

According to Equations 4 and 1, the force F and, therefore, the moment $M_{MT}$ can be reduced to zero if $\theta$ can be reduced to zero. But according to Equation 7, $\theta$ can be reduced to zero only if the numerator quantity M−XR can be made to equal zero. Therefore, for $M_{MT}=0$, $$M-XR=0 \qquad \text{Eq. 8}$$

From mechanics of material it is known that for a fixed-fixed beam vibrating at its fundamental frequency $$M = 28.1\, Y_B \frac{EI}{l_B^2} \qquad \text{Eq. 9}$$

$$R = 131\, Y_B \frac{EI}{l_B^3} \qquad \text{Eq. 10}$$

Where
E=Modulus of elasticity of beam material
l=Beam length
I=Area moment of inertia of beam cross section
$Y_B$=Beam deflection as illustrated in FIG. 3.

When Equations 9 and 10 are substituted into Equation 8 and X is solved for $$X=0.21\, l_B \qquad \text{Eq. 11}$$

Note that E, I, $Y_B$ or $l_B$ cannot =0. In the Weisbord patent it is stated that the necessary value for X is $\frac{1}{4} l_B$ to $1/6\, l_B$. It is a fundamental requirement for the Weisbord patent that the isolator mass CG be in a precise location.

The disadvantage of the Weisbord patent design is that in order to design an isolator for which x=0.21 the support structure must be thin and the isolator masses must be long and relatively thin. With such a structure, both analysis and experiments have shown that the isolator structure itself vibrates in a "tuning fork like" mode. The frequency of this "tuning fork like" mode in many cases is very close to the beam resonant frequency. This is a very undesirable condition. In other cases this frequency is below the beam resonant frequency which means that the isolator is not behaving as a rigid body at the beam resonant frequency. This is also a very undesirable condition. This "tuning fork like" resonance could be made much higher than the beam resonant frequency by designing a much thicker support and much shorter isolator masses. However, this would decrease the distance X and result in undesirable end mount reactions as previously described.

Figure 6:
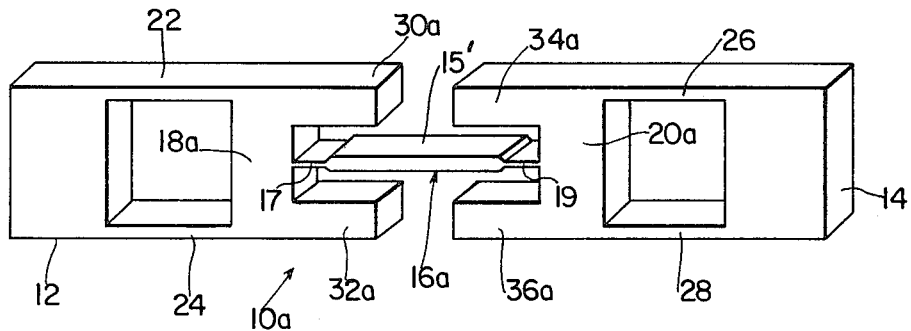
FIG. 6 is a perspective view of one embodiment of the present invention.

Referring to FIG. 6, the construction of the present invention is illustrated. Identical numerals are utilized to illustrate identical portions of the invention when compared with that of the Weisbord patent shown in FIG. 1. The primary distinction will be seen to be the configuration of the beam 16a. The illustrated beam is referred to as a non-prismal beam. It has a central section 15' of rectangular cross section as is the case in the Weisbord patent. However, outward beam sections (hinge sections) 17 and 19 step down in thickness, while retaining a rectangular cross section, and articulate at opposite ends to the support members 18a and 20a. These members for the present invention are thicker than those shown in FIG. 1. Further, the isolator masses 30a, 32a, 34a and 36a are shorter than their counterparts in FIG. 1. These structural changes alter the ratio of shear to moment reactions of the beam 16a on the isolator structure in such a manner that the distance X, illustrated in FIG. 5C, can be reduced. As a result, the "tuning fork like" resonance exhibited by the isolator masses and support members will be at a frequency much higher than the beam resonant frequency so that the beam resonant frequency is not interferred with.

Figure 7:
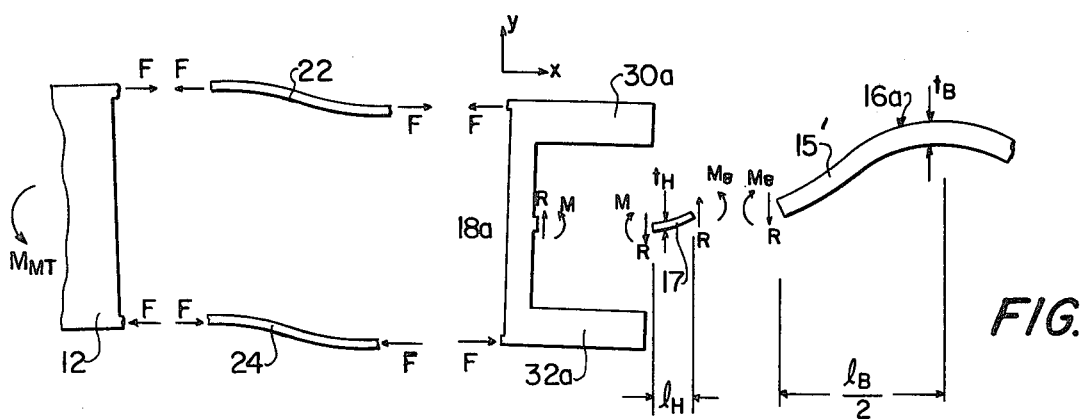
FIG. 7 is a force diagram of the present invention.

The force diagram of the present invention is shown in FIG. 7. For comparison sake is it patterned after the force diagram of the Weisbord invention shown in FIG. 4 but includes the step down hinge section 17 connecting the central section 15' of the beam with the corresponding support member 18a. Of course, a similar hinge section appears at an opposite end of the beam. Summing the forces in the Y direction on the hinge section indicates that the R reaction on the support member 18a is essentially the same as that of the prior art design illustrated in FIG. 3. However, summing the moment reactions on the hinge section indicates the following for M:

$$M = Rl_H + M_B \qquad \text{Eq. 13}$$

Note that $M_B$ is a new term for the moment reaction of the beam section on the hinge section at the point where they meet.

A prior art analysis for the condition of $l_H=0.12l_B$ and $t_H=0.50\, t_B$ indicates that $$M_B=0.03Rl_B \qquad \text{Eq. 14}$$

For the above condition of $l_H=0.12l_B$, $$X=0.15l_B \qquad \text{Eq. 15}$$

When Equation 15 is compared to Equation 11, it can be seen that the required location for the isolator has been moved back. This will allow the support portion of the isolator structure to be thickened and therefore stiffened.

Figure 8:
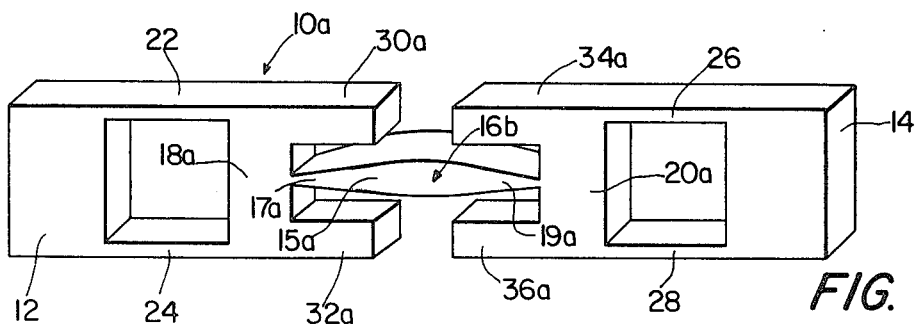
FIG. 8 is a perspective view of an alternate embodiment of the present invention.

FIG. 8 illustrates a second embodiment of the present invention wherein identical parts are referred to by identical numerals in FIGS. 2 and 8. The alternate non-prismal beam construction of FIG. 8 illustrates a beam 16b which has its thickness gradually decreasing from the center toward the end portions. Functionally, however, the beam 16b functions the same as that of beam 16a.

As described, the prismal beam construction of the present invention, as typefied by the embodiments shown in FIGS. 2 and 8 present two distinct advantages which are:

1. Reducing the X dimension (FIG. 5C) which will allow the support means of a transducer to be thickened and therefore stiffened. The non-prismal beam also allows the length of the isolator masses to be shortened. As a result, the isolator structure for a beam behaves as a rigid body. This raises the "tuning fork" resonant frequency of the isolator structure far above the beam resonant frequency. Thus, the beam resonant frequency will not be interferred with by the isolator structure.

2. Because the hinge section of the beam is thinner than the central section, it bends easily during vibration. This results in a bending moment M which will be reduced and in turn reduce any residual and undesirable F and $M_{MT}$ reactions.

It should be understood that the invention is not limited to the exact details of construction shown and described herein for obvious modifications will occur to persons skilled in the art.

I claim:

1. In a force transducer, an isolator structure generally shaped like a tuning fork for supporting a beam having a longitudinal axis and adapted to vibrate in a plane including the axis, the isolator structure comprising:

a thickened support element secured to each end of the beam and extending in both directions transversely of said axis of the beam;

a pair of end mounts;

a pair of thin spaced isolator springs extending between each mount and a corresponding support element for transmitting axial forces from the end mounts to the beam along the axis thereof; and a pair of cantilevered parallel spaced shortened isolator masses secured at first ends thereof to each support element;

wherein the isolator structure supporting the beam behaves as a rigid body and raises the "tuning fork" resonant frequency of the isolator structure far above the beam resonant frequency thereby preventing interference of the latter resonant frequency.

2. The structure set forth in claim 1 wherein the beam has a non-prismal configuration comprising a central portion which is thicker than the outward ends permitting the beam to bend easily thus reducing the bending moment.

3. The structure set forth in claim 1 wherein the beam has a central portion extending outwardly to thinner end portions, each of which has a rectangular cross section permitting the beam to bend easily thus reducing the bending moment.

4. The structure set forth in claim 1 wherein the beam has a relatively thick central portion gradually tapering at opposite ends thereof permitting the beam to bend easily thus reducing the bending moment.

5. A single beam force transducer comprising:

a beam isolating structure;

a non-prismal beam having a central portion extending outwardly to thinner end portions respectively connected to the isolating structure, the thinner end portions permitting the beam to bend easily thus reducing the bending moment.

6. The structure set forth in claim 5 wherein the beam has a rectangular cross section.

7. The structure set forth in claim 5 wherein the beam has a gradually tapering cross section.

8. The structure set forth in claim 5 wherein the isolating structure comprises:

a thickened support element secured to each end of the beam and extending in both directions transversely of said axis of the beam;

a pair of end mounts;

a pair of thin spaced isolator springs extending between each mount and a corresponding support element for transmitting axial forces from the end mounts to the beam along the axis thereof; and a pair of cantilevered parallel spaced shortened isolator masses secured at first ends thereof to each support element;

wherein the isolator structure supporting the beam behaves as a rigid body and raises the "tuning fork" resonant frequency of the isolator structure far above the beam resonant frequency thereby preventing interference of the latter resonant frequency.

* * * * *